United States Patent
Chung et al.

(10) Patent No.: US 9,287,044 B2
(45) Date of Patent: Mar. 15, 2016

(54) ELECTRONIC COMPONENT AND FABRICATION METHOD THEREOF

(71) Applicant: SAMSUNG ELECTRO-MECHANICS CO., LTD., Suwon, Gyunggi-do (KR)

(72) Inventors: Hae Sock Chung, Gyunggi-do (KR); Byoung Hwa Lee, Gyunggi-do (KR); Eun Hyuk Chae, Gyunggi-do (KR); Min Cheol Park, Gyunggi-do (KR)

(73) Assignee: SAMSUNG ELECTRO-MECHANICS CO., LTD., Gyunggi-do (KR)

( * ) Notice: Subject to any disclaimer, the term of this patent is extended or adjusted under 35 U.S.C. 154(b) by 0 days.

(21) Appl. No.: 13/737,504

(22) Filed: Jan. 9, 2013

(65) Prior Publication Data

US 2013/0250476 A1    Sep. 26, 2013

(30) Foreign Application Priority Data

Mar. 23, 2012 (KR) ........................ 10-2012-0029878

(51) Int. Cl.
*H01G 4/30* (2006.01)
*H01G 4/012* (2006.01)
*H01G 4/232* (2006.01)

(52) U.S. Cl.
CPC ............... *H01G 4/012* (2013.01); *H01G 4/232* (2013.01); *H01G 4/30* (2013.01)

(58) Field of Classification Search
USPC ........................................................ 361/303
See application file for complete search history.

(56) References Cited

U.S. PATENT DOCUMENTS

| | | | | |
|---|---|---|---|---|
| 5,687,055 A | * | 11/1997 | Miki | 361/305 |
| 2002/0146564 A1 | * | 10/2002 | Takai et al. | 428/403 |
| 2003/0041427 A1 | * | 3/2003 | Hattori | 29/25.42 |
| 2006/0279903 A1 | * | 12/2006 | Togashi et al. | 361/303 |
| 2009/0122462 A1 | * | 5/2009 | Suzuki et al. | 361/321.2 |
| 2014/0182911 A1 | * | 7/2014 | Lee et al. | 174/260 |

FOREIGN PATENT DOCUMENTS

| | | | |
|---|---|---|---|
| JP | 11144997 A | * | 5/1999 |
| JP | 2001-102243 A | | 4/2001 |
| JP | 2005-044871 A | | 2/2005 |

OTHER PUBLICATIONS

Partial Translation of JP2001-102243A, [0029].*

* cited by examiner

*Primary Examiner* — Eric Thomas
(74) *Attorney, Agent, or Firm* — McDermott Will & Emery LLP

(57) ABSTRACT

There are provided an electronic component and a fabrication method thereof. The electronic component includes: a ceramic main body including end surfaces in a length direction, side surfaces in a width direction and top and bottom surfaces in a thickness direction; first and second external electrodes formed on the end surfaces, respectively; third and fourth external electrodes formed on the side surfaces, respectively; first internal electrodes formed within the ceramic main body and connected to first and second external electrodes; and second internal electrodes alternately arranged with the first internal electrodes, while having a ceramic layer interposed therebetween, and connected to the third and fourth external electrodes, wherein thickness $t_1$ and $t_2$ of the first and second internal electrodes is 0.9 μm or less, while a roughness $R_1$ of the first internal electrode is lower than a roughness $R_2$ of the second internal electrode.

16 Claims, 6 Drawing Sheets

ELECTRONIC COMPONENT AND FABRICATION METHOD THEREOF

CROSS-REFERENCE TO RELATED APPLICATIONS

This application claims the priority of Korean Patent Application No. 10-2012-0029878 filed on Mar. 23, 2012, in the Korean Intellectual Property Office, the disclosure of which is incorporated herein by reference.

BACKGROUND OF THE INVENTION

1. Field of the Invention

The present invention relates to an electronic component and a fabrication method thereof and, more particularly, to an electronic component in which DC resistance is reduced and an excessive reduction in AC resistance is restrained, and a fabrication method thereof.

2. Description of the Related Art

A three-terminal capacitor refers to a capacitor including an input terminal, an output terminal, and a ground terminal, such a capacitor also being known as a feed-through capacitor.

When an electrical signal including noise is introduced through an input/output terminal in an electronic circuit, the three-terminal capacitor serves to induce noise into a ground path configured in a product.

The three-terminal capacitor has low residual inductance characteristics, exhibiting excellent noise attenuation characteristics in a high frequency region, and allowing for the fabrication of products having various levels of capacitance, and thus, attenuation characteristics may be implemented in various frequency bands thereby.

Namely, noise attenuation of an electrical signal is increased according to an increase in capacitance, while a magnetic resonance frequency is shifted to a low frequency band to significantly lower an attenuation factor in a high frequency band, so capacitance corresponding to a frequency band appropriate for a circuit can be selected to be used for a noise filter.

SUMMARY OF THE INVENTION

An aspect of the present invention provides an electronic component in which DC resistance is reduced and an excessive reduction in AC resistance is restrained, and a fabrication method thereof.

According to an aspect of the present invention, there is provided an electronic component including: a ceramic main body including two end surfaces in a length direction, two side surfaces in a width direction and top and bottom surfaces in a thickness direction; first and second external electrodes formed on the two end surfaces in the length direction, respectively; third and fourth external electrodes formed on the two side surfaces in the width direction, respectively; first internal electrodes formed within the ceramic main body and connected to first and second external electrodes; and second internal electrodes alternately arranged with the first internal electrodes, while having a ceramic layer interposed therebetween, and connected to the third and fourth external electrodes, wherein a thickness $t_1$ of the first internal electrode is 0.9 μm or less and a thickness $t_2$ of the second internal electrode is 0.9 μm or less, while a roughness $R_1$ of the first internal electrode is lower than a roughness $R_2$ of the second internal electrode.

The electronic component may be a three-terminal electronic component.

$(R_1/R_2) \le 0.9$ may be satisfied.
$(R_2/t_2) \le 0.5$ may be satisfied.
$(R_2/t_2) \le 0.5$ may be satisfied.

The third and fourth external electrodes may extend to portions of the top and bottom surfaces of the ceramic main body.

The first and second internal electrodes may include a capacitance forming portion and a lead out portion.

A dimension of the lead out portion of the second internal electrode in the length direction may be smaller than that of the capacitance forming portion of the second internal electrode in the length direction.

A dimension of the lead out portion of the second internal electrode in the length direction may be smaller than that of the third and fourth external electrodes in the length direction.

According to another aspect of the present invention, there is provided a multi-terminal electronic component including: first and second external electrodes formed on two end surfaces of a ceramic main body in a length direction thereof, respectively; a plurality of third and fourth external electrodes formed on two side surfaces of the ceramic main body in a width direction thereof, respectively; a plurality of first internal electrodes laminated within the ceramic main body and connected to the first and second external electrodes; and a plurality of second internal electrodes alternately arranged with the plurality of first internal electrodes, while having a ceramic layer interposed therebetween, and connected to the plurality of third and fourth external electrodes, wherein a thickness $t_1$ of the first internal electrode is 0.9 μm or less and a thickness $t_2$ of the second internal electrode is 0.9 μm or less, while a roughness $R_1$ of the first internal electrode is lower than a roughness $R_2$ of the second internal electrode.

$(R_2/t_2) \le 0.5$ may be satisfied.
$(R_1/R_2) \le 0.9$ may be satisfied.

The plurality of third and fourth external electrodes may extend to portions of the top and bottom surfaces of the ceramic main body.

The first and second internal electrodes may include a capacitance forming portion and a lead out portion.

A dimension of the lead out portion of the second internal electrode in the length direction may be smaller than that of the capacitance forming portion of the second internal electrode in the length direction.

A dimension of the lead out portion of the second internal electrode in the length direction may be smaller than that of the third and fourth external electrodes in the length direction.

According to another aspect of the present invention, there is provided a method of fabricating an electronic component, the method including: preparing first and second ceramic green sheets; preparing a first conductive paste including a first conductive metal; preparing a second conductive paste including a second conductive metal having an average particle diameter greater than that of the first conductive metal, and having a higher viscosity than that of the first conductive paste; forming first and second internal electrodes on the first and second ceramic green sheets with the first and second conductive pastes, respectively; and laminating the first and second ceramic green sheets, and severing and sintering the same.

The first and second conductive metals may be made of the same material.

The electronic component may be a three-terminal or multi-terminal electronic component.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
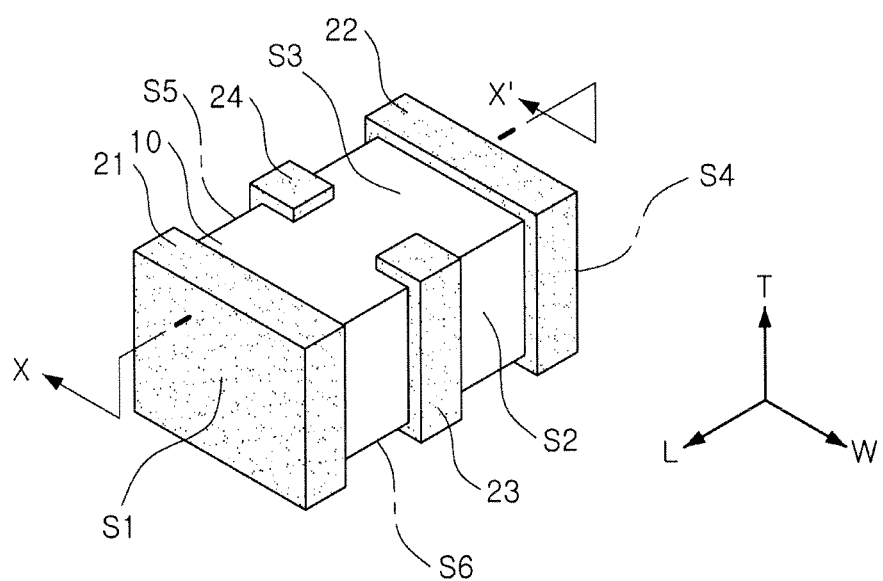
FIG. 1 is a perspective view of an electronic component according to an embodiment of the present invention.

Embodiments of the present invention will now be described in detail with reference to the accompanying drawings.

The invention may, however, be embodied in many different forms, and should not be construed as being limited to the embodiments set forth herein.

Rather, these embodiments are provided so that this disclosure will be thorough and complete, and will fully convey the scope of the invention to those skilled in the art.

In the drawings, the shapes and dimensions of components may be exaggerated for clarity, and the same reference numerals will be used throughout to designate the same or like components.

Figure 2:
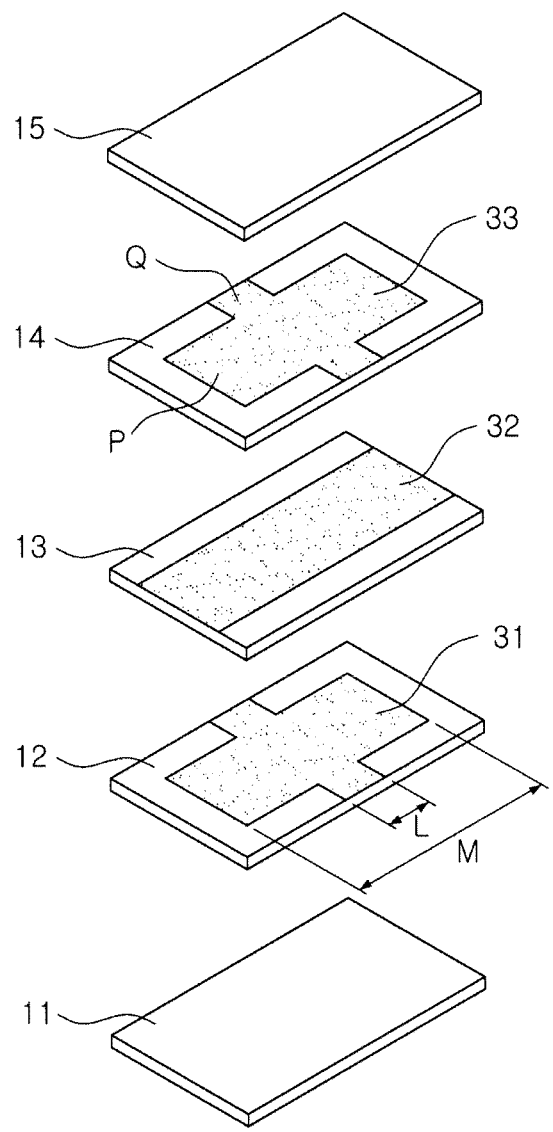
FIG. 2 is an exploded perspective view of the electronic component according to an embodiment of the present invention.
Figure 3:
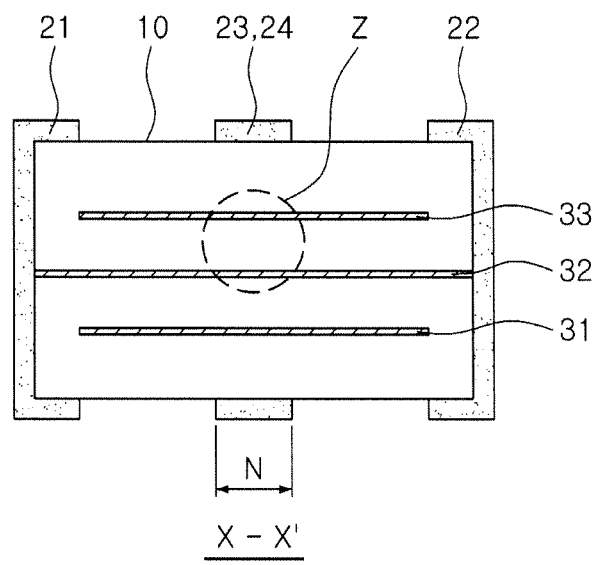
FIG. 3 is a cross-sectional view taken along line X-X' of FIG. 1.
Figure 4:
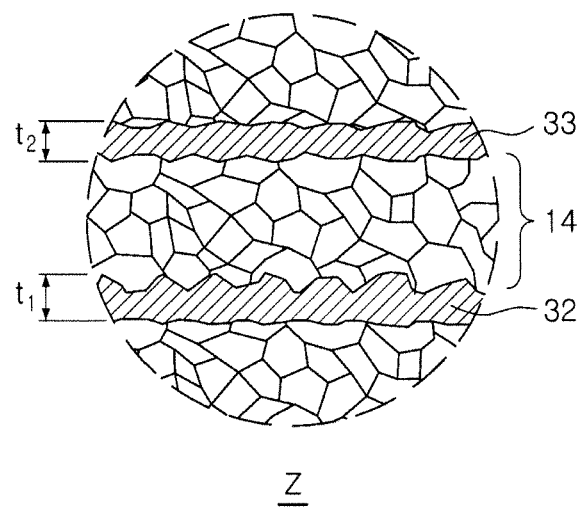
FIG. 4 is an enlarged view of portion Z of FIG. 3.
Figure 5:
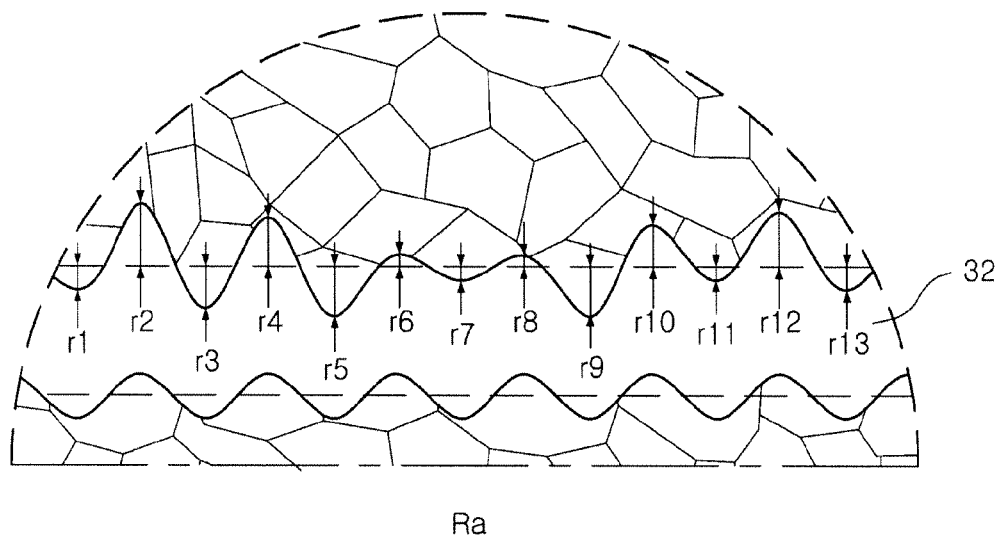
FIGS. 5 and 6 are schematic views explaining a measurement of roughness of internal electrodes.
Figure 6:
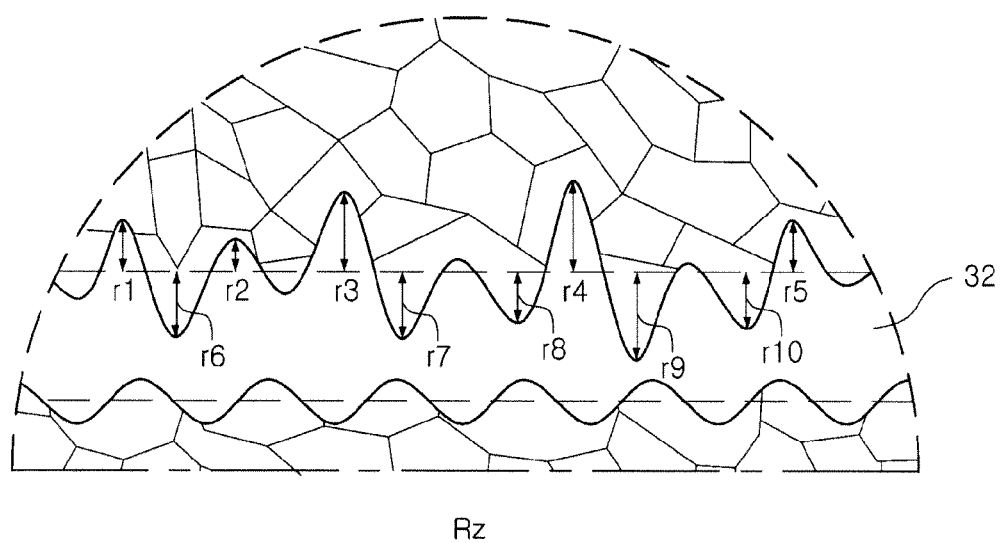

FIG. 1 is a perspective view of an electronic component according to an embodiment of the present invention. FIG. 2 is an exploded perspective view of the electronic component according to an embodiment of the present invention. FIG. 3 is a cross-sectional view taken along line X-X' of FIG. 1. FIG. 4 is an enlarged view of portion Z of FIG. 3. FIGS. 5 and 6 are schematic views explaining a measurement of roughness of internal electrodes.

With reference to FIGS. 1 to 3, an electronic component according to an embodiment of the present invention may include a ceramic main body 10, external electrodes 21 to 24 formed on an outer surface of the ceramic main body 10, and internal electrodes 32 and 33 laminated to be disposed within the ceramic main body 10. In detail, a three-terminal capacitor will be described as an example.

In FIG. 1, an "L" direction will be referred to as a length direction, a "W" direction will be referred to as a width direction', and a "T" direction will be referred to as a thickness direction.

The ceramic main body 10 may have a rectangular parallelepiped shape, and may have two end surfaces S1 and S4 in the length direction, two side surfaces S2 and S5 in the width direction, and top and bottom surfaces S3 and S6 in the thickness direction.

The ceramic main body 10 may include a ceramic material, namely, a dielectric substance having high permittivity. Specifically, the ceramic main body 10 may include barium titanate, strontium titanate, or the like.

When a dielectric substance is positioned between two electrodes to which different polarities are applied, an electric dipole within the dielectric substance may be aligned in response to an electrical field formed by the two electrodes, and accordingly, a large amount of electric charge may be accumulated in the two electrodes.

The external electrodes may include first to fourth external electrodes 21 to 24.

The first and second external electrodes 21 and 22 may be formed on two end surfaces S1 and S4 in the length direction of the ceramic main body 10. The first and second external electrodes 21 and 22 may be formed to oppose each other in the length direction of the ceramic main body 10. Also, the first and second external electrodes 21 and 22 may be formed to extend to portions of the surfaces S2, S3, S5, and S6 adjacent to the two end surfaces 51 and S4 in the length direction of the ceramic main body 10.

The third and fourth external electrodes 23 and 24 may be formed on two side surfaces S2 and S5 in the width direction of the ceramic main body 10. The third and fourth external electrodes 23 and 24 may be formed to oppose each other in the width direction of the ceramic main body 10. Also, the third and fourth external electrodes 23 and 24 may be formed to extend to portions of the top and bottom surfaces S3 and S6 of the ceramic main body 10.

A voltage including a DC component as a signal and an AC component as noise may be applied to the first and second external electrodes 21 and 22, and the third and fourth external electrodes 23 and 24 may be connected to a ground to cancel the AC component as noise.

The external electrodes 21 to 24 may include a conductive metal such as gold, silver, copper, nickel, palladium, or the like, as a main component to have conductivity, and thus, the external electrodes 21 to 24 may effectively transfer electricity applied from the outside to the internal electrodes 32 and 33.

Also, the external electrodes 21 to 24 may further include glass, and here, glass may fill pores present within the external electrodes 21 to 24 to enhance the compactness thereof. Since the compactness of the external electrodes 21 to 24 is enhanced, a plating solution may be prevented from infiltrating into the external electrodes 21 to 24, thus enhancing a lifespan and reliability of a product.

The internal electrodes may include first and second internal electrodes 32 and 33.

The first internal electrode 32 is formed within the ceramic main body 10 and may be connected to the first and second external electrodes 21 and 22.

The second internal electrode 33 is disposed to be laminated with the first internal electrode 32, while having a ceramic layer 14 interposed therebetween, and may be connected to the third and fourth external electrodes 23 and 24.

The first internal electrode 32 may be called a signal electrode and the second internal electrode 33 may be called a ground electrode.

In the present embodiment, the thickness of the first and second internal electrodes 32 and 33 may range from about 0.2 μm~0.9 μm. Namely, when thicknesses of the respective first and second internal electrodes 32 and 33 are $t_1$ and $t_2$, 0.2 μm≤$t_1$≤0.9 μm and 0.2 μm≤$t_2$0.9 μm may be satisfied.

The fact that the thicknesses $t_1$ and $t_2$ of the first and second internal electrodes 32 and 33 are 0.9 μm or less may be explained as follows. Namely, when the thicknesses $t_1$ and $t_2$ of the first and second internal electrodes 32 and 33 exceed 0.9 μm, since the cross-sectional areas of the internal electrodes 32 and 33 are sufficiently large, DC resistance of the internal electrodes 32 and 33 may be sufficiently low, and thus, signal attenuation due to an increase in DC resistance may not occur.

However, when the thicknesses $t_1$ and $t_2$ of the first and second internal electrodes 32 and 33 are less than 0.9 μm, connectivity of the internal electrodes 32 and 33 may be sharply reduced and roughness may be increased to rapidly increase DC resistance.

The present embodiment is provided to solve the problem caused as DC resistance is increased when the thicknesses $t_1$ and $t_2$ of the first and second internal electrodes 32 and 33 are less than 0.9 μm.

Relevant experimental results are shown in Table 1 below.

TABLE 1

| Classification | Thickness ($t_1$ and $t_2$) of internal electrodes (μm) | DC resistance of three-terminal component (mΩ) |
|---|---|---|
| Sample 1 | 0.5 | 183 |
| Sample 2 | 0.6 | 172 |
| Sample 3 | 0.7 | 143 |
| Sample 4 | 0.8 | 121 |
| Sample 5 | 0.9 | 92 |
| Sample 6 | 1.0 | 73 |
| Sample 7 | 1.2 | 65 |

With reference to FIG. 1, it can be seen that as the thicknesses $t_1$ and $t_2$ of the internal electrodes are reduced to be less than 0.9 μm, DC resistance is sharply increased to be more than 100 mΩ.

The fact that the thicknesses $t_1$ and $t_2$ of the internal electrodes are 0.2 μm or more may be explained as follows. Namely, when the thicknesses $t_1$ and $t_2$ of the internal electrodes are less than 0.2 μm, coverage of the internal electrodes 32 and 33 is too insufficient to implement capacitance, resulting in a failure of capacitor function.

In the present embodiment, roughness of the first internal electrode 32 is less than that of the second internal electrode 33. In detail, the roughness of the first internal electrode 32 may be equal to or less than 0.9 times that of the second internal electrode 33. Namely, when the roughness of the first internal electrode 32 is $R_1$ and that of the second internal electrode 33 is $R_2$, $(R_1/R_2) \leq 0.9$ may be satisfied.

By allowing the roughness $R_2$ of the second internal electrode 33 connected to a ground terminal to be greater than the roughness $R_1$ of the first internal electrode 32, AC resistance of the second internal electrode 33 may not be relatively reduced even in the case that the DC resistance of the first internal electrode 32 is reduced.

Since the AC resistance of the second internal electrode 33 is relatively high, the following problems, appearing when the AC resistance is low, may be avoided. Namely, when the AC resistance is low, equivalent series resistance (ESR) is also reduced, and when the ESR is excessively low, a parallel resonance phenomenon may occur to thereby increase impedance.

The roughnesses $R_1$ and $R_2$ of the internal electrodes 32 and 33 may be lowered by granulating nickel powder used as a material of the internal electrodes 32 and 33, fabricating a paste having a low viscosity by adjusting a type or content of an organic solvent, a binder, or the like, and forming the internal electrodes 32 and 33 with the paste.

As the average particle diameter of the nickel powder is increased, the roughnesses $R_1$ and $R_2$ of the internal electrodes 32 and 33 may be increased. As the content of the organic solvent is increased, viscosity of the paste may be reduced and the roughnesses $R_1$ and $R_2$ of the internal electrodes 32 and 33 may be reduced. As the content of the binder is increased, the viscosity of the paste may be increased and the roughnesses $R_1$ and $R_2$ of the internal electrodes 32 and 33 may be increased.

By appropriately adjusting the particle diameter of the nickel powder and the type or content of the organic solvent, the binder, and the like, the viscosity of the paste used for the internal electrodes may be appropriately adjusted to have a desired level.

In the present embodiment, the roughness $R_2$ of the second internal electrode 33 may be less than the thickness $t_2$ of the second internal electrode 33, and in detail, it may be half of the thickness $t_2$ of the second internal electrode 33. Namely, $(R_2/t_2) \leq 0.5$ may be satisfied.

When $(R_2/t_2) \leq 0.5$ is satisfied, the connectivity of the second internal electrode may be degraded. The fact that the roughness of the internal electrode is high means that the surface of the internal electrode is severely irregular. When the roughness of the second internal electrode is greater than half of the thickness of the second internal electrode, a hole penetrating the internal electrode may be formed. Then, connectivity of the second internal electrode may be lowered.

The first and second internal electrodes 32 and 33 may include a capacitance forming portion P and a lead out portion Q. The capacitance forming portion P and the lead out portion Q may be rectangular, but the present invention is not limited thereto. Here, the capacitance forming portion P and the lead out portion Q may not have perfect rectangular shapes, due to an error in a fabrication process.

Also, the shapes of the capacitance forming portion P and the lead out portion Q of the first and second internal electrodes 32 and 33 may be variably modified according to a design reference (or a design basis).

The capacitance forming portion P, contributing to capacitance formation, may overlap with the neighboring internal electrode 33. The lead out portion Q may be formed such that one end of the capacitance forming portion of the internal electrode extends to be led out to the surface of the ceramic main body 10 and connected to the external electrodes 21 to 24, which does not contribute to capacitance formation.

In the second internal electrode 33, a dimension L of the lead out portion Q in the length direction may be smaller than a dimension M of the capacitance forming portion P in the length direction and also smaller than a dimension N of the third and fourth external electrodes 23 and 24 in the length direction.

In order to obtain capacitance, the size of the capacitance forming portion P of the second internal electrode 33 may remain unchanged, while the size of the lead out portion Q may be reduced. Namely, the dimension L of the lead out portion Q in the length direction may be reduced.

The second internal electrode 33 may be led out to the side surfaces of the ceramic main body 10 in the width direction and connected to the third and fourth external electrodes 23 and 24. Thus, in order for the third and fourth external electrodes 23 and 24 to cover the lead out portion Q exposed from the surface of the ceramic main body 10, the dimension L of the lead out portion Q in the length direction should be smaller than the dimension N of the third and fourth external electrodes 23 and 24 in the length direction.

The internal electrodes 32 and 33 may be made of at least one selected from the group consisting of gold (Au), silver (Ag), copper (Cu), nickel (Ni), palladium (Pd), and alloys thereof.

Hereinafter, a measurement of thicknesses $t_1$ and $t_2$ of the internal electrodes 32 and 33 will be described with reference to FIG. 4.

The thicknesses t1 and t2 of the internal electrodes 32 and 33 may be measured in an image obtained by scanning a cross section of the ceramic main body 10 in the length and thickness directions with a scanning electron microscope (SEM).

For example, as shown in FIG. 4, an average value may be obtained by measuring thicknesses at 30 equidistant points on the internal electrodes 32 and 33 in the length direction, extracted from the image of the cross section in the length and thickness directions cut at a central portion of the ceramic main body 10 in the width direction, obtained through SEM scanning.

The 30 equidistant points may be measured at the capacitance forming portion P in which the first and second internal electrodes 32 and 33 overlap.

In addition, when this measurement process is extensively performed on 10 or more internal electrodes 32 and 33, the average thickness of the internal electrodes 32 and 33 may be further generalized.

A measurement of the roughnesses $R_1$ and $R_2$ of the internal electrodes 32 and 33 will be described with reference to FIGS. 5 and 6.

Parameters indicating roughness include a center line average roughness $R_a$ and a ten point average roughness R. Roughness used in an embodiment of the present invention may be the center line average roughness $R_a$.

The center line average roughness $R_a$ is a value of surface roughness of the inner electrode, which may be a roughness of the inner electrode calculated by obtaining an average value based on a virtual center line of the roughness.

A detailed method of calculating the center line average roughness $R_a$ is as follows. With reference to FIG. 5, a virtual center line may be drawn over the roughness formed on one surface of the inner electrodes 32 and 33, respective distances (e.g., $r_1, r_2, r_3 \ldots r_{13}$) are measured based on the virtual center line of roughness, and then, a value obtained by averaging the respective distances may be determined as a center line average roughness $R_a$ of the internal electrodes 32 and 33.

$$Ra = \frac{r_1 + r_2 + r_3 + \ldots r_n}{n}$$

For reference, the ten point average roughness $R_z$ may refer to a value calculated by adding average values of the respective distances to the five highest points above the virtual center line and the five lowest points below the virtual center line based on the virtual center line of roughness.

In detail, with reference to FIG. 6, in order to calculate the ten point average roughness $R_z$, a virtual center line may be provided with respect to the roughness formed on one surface of the inner electrodes 32 and 33.

Next, based on the virtual center line of roughness, the respective distances to the five highest points ($r_1+r_2+r_3+r_4+r_5$) above the virtual center line and the respective distances to the five lowest points ($r_6+r_7r_8+r_9+r_{10}$) below the virtual center line may be measured, and then, the average value of the respective distances may be calculated as represented by Equation shown below:

$$Rz = \frac{(r_1 + r_2 + r_3 + r_4 + r_5) + (r_6 + r_7 + r_8 + r_9 + r_{10})}{10}$$

Operational effects of the three-terminal electronic component according to the present embodiment will be described.

When a DC component corresponding to a signal and an AC component corresponding to noise are applied to the first internal electrode 32, the noise included in the signal may flow to the second internal electrode 33 connected to a ground so as to be canceled. However, when DC resistance of the first internal electrode 32 is high, the signal may be rather attenuated.

In the present embodiment, the roughness of the first internal electrode 32 is lowered to reduced the DC resistance of the first internal electrode 32, while the roughness of the second internal electrode 33 is maintained to be relatively great to prevent AC resistance of the second internal electrode 33 from being lowered, thus preventing an increase in impedance due to a parallel resonance phenomenon.

Hereinafter, another embodiment of the present invention will be described.

Figure 7:
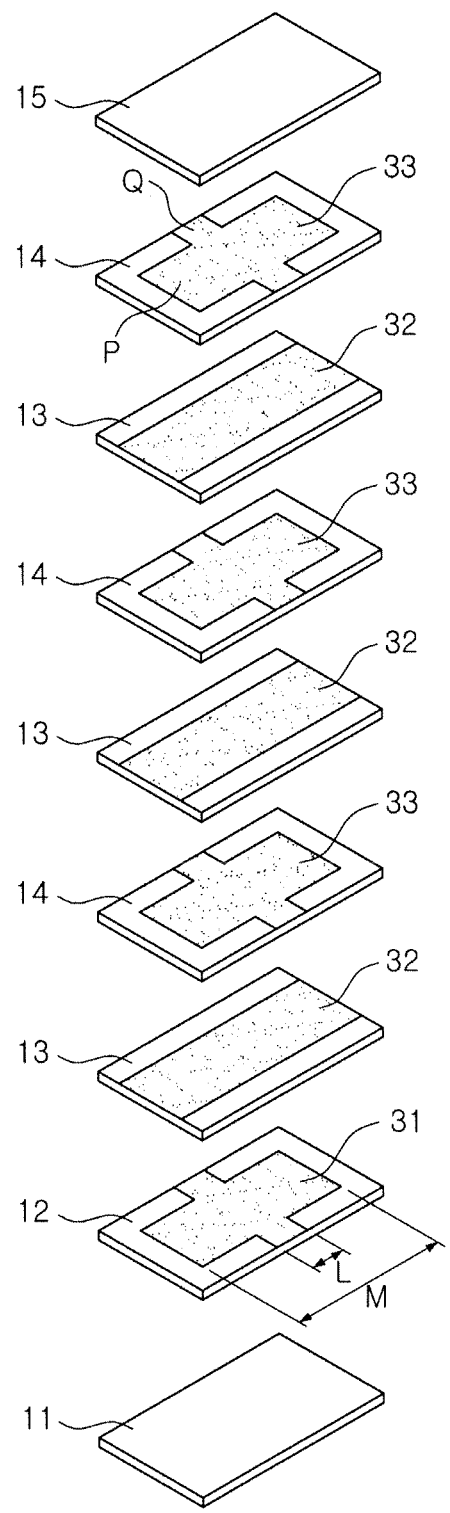
FIG. 7 is an exploded perspective view of an electronic component according to another embodiment of the present invention.
Figure 8:
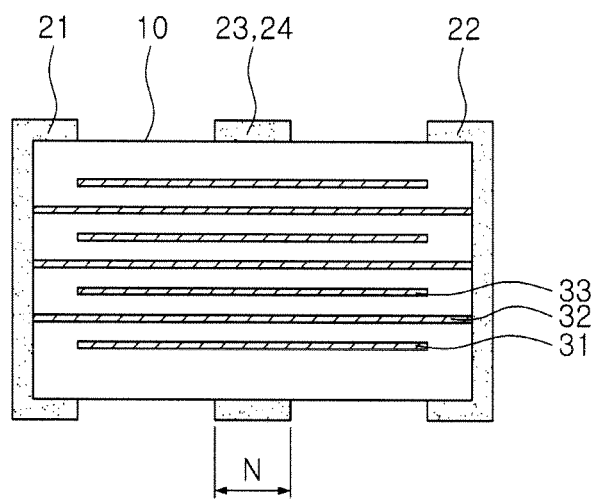
FIG. 8 is a cross-sectional view of the electronic component according to another embodiment of the present invention, taken along line X-X' of FIG. 1.

A perspective view of a multi-terminal electronic component according to the present embodiment is identical to that of FIG. 1. FIG. 7 is an exploded perspective view of an multi-terminal electronic component according to the present embodiment, and FIG. 8 is a cross-sectional view of the multi-terminal electronic component according to the present embodiment, taken along line X-X' of FIG. 1.

With reference to FIG. 1, the multi-terminal electronic component according to the present embodiment may include a ceramic main body 10, external electrodes 21 to 24 formed on the outer surface of the ceramic main body 10, and internal electrodes 32 and 33 laminated to be disposed within the ceramic main body 10.

The external electrodes may include first to fourth external electrodes 21 to 24. The first and second external electrodes 21 and 22 may be formed on two end surfaces S1 and S4 in the length direction of the ceramic main body 10. Also, third and fourth external electrodes 23 and 24 may be formed on two side surfaces S2 and S5 in the width direction of the ceramic main body 10.

The internal electrodes may include first and second internal electrodes 32 and 33. A plurality of first internal electrodes 32 may be formed within the ceramic main body 10 and may be connected to the first and second external electrodes 21 and 22. A plurality of second internal electrode 33 may be alternately laminated with the plurality of first internal electrodes 32, while having each of ceramic layers 14 interposed therebetween.

The thicknesses $t_1$ and $t_2$ of the first and second internal electrodes 32 and 33 may be 0.9 μm or less, and the roughness $R_1$ of the first internal electrode 32 may be lower than that of the roughness $R_2$ of the second internal electrode 33.

In the present embodiment, the plurality of first internal electrodes 32 may be laminated and the second internal electrodes 33 may be alternately disposed between the first internal electrodes 32.

As the number of the internal electrodes 32 and 33 is increased, DC resistance may be reduced, and the number of laminated internal electrodes 32 and 33 may be appropriately designed according to required characteristics.

In the present embodiment, the third and fourth external electrodes may be formed on two side surfaces of the ceramic main body. In this case, a plurality of third and fourth external electrodes may be provided.

In the present embodiment, $(R_1/R_2) \leq 0.9$ and $(R_2/t_2) \leq 0.5$ may be satisfied.

The first and second external electrodes 21 and 22 may be formed to extend to portions of the surfaces S2, S3, S5, and S6 adjacent to the two end surfaces S1 and S4 in the length direction of the ceramic main body 10.

The third and fourth external electrodes 23 and 24 may be formed to extend to portions of the top and bottom surfaces S3 and S6 of the ceramic main body 10.

The first and second internal electrodes 32 and 33 may include a capacitance forming portion P and a lead out portion Q. The capacitance forming portion P and the lead out portion Q may have a rectangular shape.

In the second internal electrode 33, a dimension L of the lead out portion Q in the length direction may be smaller than a dimension M of the capacitance forming portion P in the length direction.

The dimension L of the lead out portion Q in the length direction may be smaller than a dimension N of the third and fourth external electrodes 23 and 24 in the length direction.

The ceramic main body 10 may include a dielectric substance having high permittivity, and the dielectric substance may include barium titanate.

The internal electrodes 32 and 33 may be made of at least one selected from the group consisting of gold (Au), silver (Ag), copper (Cu), nickel (Ni), palladium (Pd), and alloys thereof.

Details regarding the ceramic main body 10, the internal electrodes 32 and 33, and the external electrodes 21 to 24 are the same as those described in the former embodiment.

A method of fabricating a three-terminal electronic component according to another embodiment of the present invention may include: preparing first and second ceramic green sheets; preparing a first conductive paste including a first conductive metal; preparing a second conductive paste including a second conductive metal having an average particle diameter greater than that of the first conductive metal and having a higher viscosity than that of the first conductive paste; forming first and second internal electrodes on the first and second ceramic green sheets with the first and second conductive pastes, respectively; and laminating the first and second ceramic green sheets, and severing and sintering the same.

In the present embodiment, expressions of 'first' and 'second' are merely used to discriminate constituent elements and should not be construed as limiting the present invention in any manner.

First, ceramic powder, an organic solvent, a binder, and the like, are mixed, and then, ball-milled to fabricate a ceramic slurry, and the ceramic slurry is processed through a doctor blade method, or the like, to fabricate a ceramic green sheet.

Conductive metal powder having a relatively small average particle diameter may be added to the first conductive paste, and conductive metal powder having a relatively large average particle diameter may be added to the second conductive paste.

The average particle diameter of the conductive metal powder is reduced in order to reduce roughnesses of the internal electrodes.

Viscosity of the first conductive paste may be less than that of the second conductive paste.

The viscosity of the conductive paste may be adjusted by adjusting the amount of the binder included therein. As the content of the binder is increased, the viscosity of the conductive paste is also increased, and as the content of the binder is decreased, the viscosity of the conductive paste is reduced.

A first internal electrode may be formed on the first ceramic green sheet with the first conductive paste, and a second internal electrode may be formed on the second ceramic green sheet with the second conductive paste.

The first and second ceramic green sheets with the first and second internal electrodes formed thereon, respectively, may be alternately laminated to form a green sheet laminate. The number of laminated green sheets may be modified according to a design reference.

The green sheet laminate is severed to form a green chip, and the green chip is sintered to form a sintered chip. When nickel is used as a material of the internal electrode, sintering is required to be performed under a reducing atmosphere in order to prevent the nickel from being oxidized.

External electrodes including copper as a main component may be formed on an outer surface of the sintered chip. Also, in order to prevent a plating solution from infiltrating into the external electrodes, glass may be added thereto. A tin plated layer may be formed on the external electrode to enhance soldering characteristics.

Since the average particle diameter of the conductive metal powder of the first conductive paste is relative small and the viscosity of the first conductive paste is relative low, the roughness of the first internal electrode may be less than that of the second internal electrode.

The first and second ceramic green sheets may include barium titanate.

The conductive metal may include at least one selected from the group consisting of gold (Au), silver (Ag), copper (Cu), nickel (Ni), palladium (Pd), and alloys thereof.

INVENTIVE EXAMPLES

Hereinafter, the present invention will be described in detail with reference to Inventive Examples and Comparative Examples.

The three-terminal electronic component according to an embodiment of the present invention was prepared in the following manner.

First, 300 g of barium titanate powder, 85 g of ethanol, 57 g of toluene, and zirconia balls having a diameter of 0.1 mm were mixed, on which 3-roll ball milling was performed for five hours to fabricate ceramic slurry.

The ceramic slurry was applied to a polyethylene film according to a doctor blade method, and dried to fabricate a ceramic green sheet, and here, the ceramic green sheet had a thickness of 1.5 μm.

Nickel powder, an organic solvent, and a binder were mixed, and ceramic balls were added to the mixture, which was then ball-milled to prepare conductive paste.

Terpineol was used as an organic solvent and EC (ethyl cellulose) was used as a binder. Zirconia balls having a diameter of 0.3 mm were used as ceramic balls, and ball milling was performed for seven hours.

As the conductive paste, a first conductive paste including smaller nickel particles and having low viscosity and a second conductive paste including larger nickel particles and having high viscosity were prepared.

In the first conductive paste, nickel powder having an average grain size of 180 nm was used, and the viscosity of the first conductive paste was varied by changing the content of a binder within a range from 90 g to 150 g.

The second conductive paste was fabricated in the same manner as that of the first conductive paste. However, nickel power having an average particle diameter (300 nm) greater than that of the first conductive paste was used, and the content of the binder was 200 g. The viscosity of the second conductive paste was 20,000 cps.

The viscosity of the first conductive paste ranged from 9,000 cps to 15,000 cps, and was lower than that of the second conductive paste.

A first internal electrode was formed on a ceramic green sheet with the first conductive paste, and a second internal electrode was formed on another ceramic green sheet with the second conductive paste.

The ceramic green sheets with the first and second internal electrodes formed thereon were alternately laminated to fabricate a ceramic green sheet laminate in which one hundred and twenty first internal electrodes and one hundred and twenty second internal electrodes were laminated, and then, the ceramic green sheet laminate was severed to obtain green chips.

The green chip was calcined at 260° C. for 50 hours under an air atmosphere, and then, sintered at 1,190° C. for 23 hours under a reducing atmosphere to obtain a sintered chip.

External electrodes were formed with a conductive paste including copper as a main ingredient on the sintered chip to fabricate a three-terminal capacitor.

The average thicknesses $t_1$ and $t_2$ of the internal electrodes 32 and 33 were 0.8 μm.

DC resistance of the fabricated three-terminal capacitor was measured with a Milliohmmeter 4338B by Agilent Co.

Thereafter, the thicknesses $t_1$ and $t_2$ and roughnesses $R_1$ and $R_2$ of the internal electrodes 32 and 33 were measured through a SEM micrograph of polished sections. The measurement of the thicknesses and the roughnesses of the internal electrodes were performed in the same manner as described above, and the results are shown in Table 2 below.

TABLE 2

| Classification | $t_2$ (μm) | $R_2$ (μm) | $R_2/t_2$ | $R_1$ (μm) | $R_1/R_2$ | DC Resistance (mΩ) | Electrode Connectivity (%) |
|---|---|---|---|---|---|---|---|
| Inventive Example 1 | 0.8 | 0.1 | 0.13 | 0.01 | 0.100 | 51 | 98 |
| Inventive Example 2 | | | | 0.03 | 0.300 | 53 | 97 |
| Inventive Example 3 | | | | 0.05 | 0.500 | 54 | 97 |
| Inventive Example 4 | | | | 0.07 | 0.700 | 55 | 96 |
| Inventive Example 5 | | | | 0.09 | 0.900 | 56 | 96 |
| Inventive Example 6 | | 0.2 | 0.25 | 0.01 | 0.050 | 53 | 96 |
| Inventive Example 7 | | | | 0.1 | 0.500 | 58 | 94 |
| Inventive Example 8 | | | | 0.15 | 0.750 | 59 | 94 |
| Comparative Example 1 | | | | 0.2 | 1.000 | 82 | 93 |
| Comparative Example 2 | | | | 0.25 | 1.250 | 96 | 92 |
| Inventive Example 9 | | 0.3 | 0.38 | 0.1 | 0.333 | 59 | 93 |
| Inventive Example 10 | | | | 0.15 | 0.500 | 60 | 92 |
| Inventive Example 11 | | | | 0.2 | 0.667 | 67 | 92 |
| Comparative Example 3 | | | | 0.3 | 1.000 | 86 | 90 |
| Comparative Example 4 | | | | 0.4 | 1.333 | 98 | 87 |
| Inventive Example 12 | | 0.4 | 0.5 | 0.1 | 0.250 | 61 | 92 |
| Inventive Example 13 | | | | 0.2 | 0.500 | 65 | 90 |
| Inventive Example 14 | | | | 0.3 | 0.750 | 73 | 88 |
| Comparative Example 5 | | | | 0.4 | 1.000 | 97 | 86 |
| Comparative Example 6 | | | | 0.5 | 1.250 | 108 | 84 |
| Comparative Example 7 | | 0.5 | 0.63 | 0.1 | 0.200 | 62 | 79 |
| Comparative Example 8 | | | | 0.2 | 0.400 | 68 | 77 |
| Comparative Example 9 | | | | 0.3 | 0.600 | 71 | 75 |
| Comparative Example 10 | | | | 0.4 | 0.800 | 77 | 74 |
| Comparative Example 11 | | | | 0.5 | 1.000 | 115 | 72 |

With reference to Table 2, the roughness $R_1$ of the first internal electrode 32 was changed within a range from 0.01 μm to 0.5 μm, and the roughness $R_2$ of the second internal electrode 33 was changed within a range from 0.1 μm to 0.5 μm.

In Inventive Examples 1 to 5, $R_1/R_2$ ranged from 0.1 to 0.9, which was less than 1. In this case, DC resistance was 51 mΩ~56 mΩ, which was relatively low. Also, $R_2/t_2$ was 0.13, which indicated that electrode connectivity was excellent.

In Inventive Examples 6 to 8, $R_1/R_2$ ranged from 0.05 to 0.75, which was less than 1. In this case, the DC resistance was 53 mΩ~59 mΩ, which was relatively low. Also, $R_2/t_2$ was 0.25, which indicated that electrode connectivity was excellent. Meanwhile, in Comparative Examples 1 and 2, $R_1/R_2$ was 1 or more, and DC resistance rapidly increased to be 82 mΩ or higher.

In Inventive Examples 9 to 11, $R_1/R_2$ ranged from 0.333 to 0.667, which was less than 1. In this case, DC resistance was 59 mΩ~67 mΩ, which was relatively low. Also, $R_2/t_2$ was 0.38, which indicated that electrode connectivity was excellent. Meanwhile, in Comparative Examples 3 and 4, $R_1/R_2$ was 1 or more, and DC resistance rapidly increased to be 86 mΩ or higher.

In Inventive Examples 12 to 14, $R_1/R_2$ ranged from 0.25 to 0.75, which was less than 1. In this case, DC resistance was 61 mΩ~73 mΩ, which was relatively low. Also, $R_2/t_2$ was 0.5, which indicated that electrode connectivity was excellent. Meanwhile, in Comparative Examples 5 and 6, $R_1/R_2$ was 1 or more, and DC resistance rapidly increased to be 97 mΩ or higher.

In Comparative Examples 7 to 10, $R_1/R_2$ ranged from 0.2 to 0.8, which was less than 1. In this case, DC resistance was 62 mΩ~77 mΩ, which was relatively low. Meanwhile, in Comparative Example 11, $R_1/R_2$ was 1 or more, and DC resistance rapidly increased to be 115 mΩ or higher.

In Comparative Examples 7 to 11, $R_2/t_2$ was 0.63, which exceeded 0.5. In this case, DC resistance was relatively low, but electrode connectivity was less than 80%, which was relatively low. The reason is because, the roughness of the second internal electrode is large over the thickness of the second internal electrode, so there may be many holes penetrating the second internal electrode. Thus, in consideration of electrode connectivity, $R_2/t_2$ may preferably be 0.5 or less.

In conclusion, according to Table 2, incase in which the thicknesses $t_1$ and $t_2$ of the first and second internal electrodes 32 and 33 were 0.9 μm or less, $R_1/R_2$ should be 0.9 or less to allow DC resistance to be relatively low, and when $R_1/t_2$ was less than 0.5, electrode connectivity was excellent.

As set forth above, according to embodiments of the invention, a three-terminal electronic component in which DC resistance is reduced while AC resistance is not reduced can be obtained.

While the present invention has been shown and described in connection with the embodiments, it will be apparent to those skilled in the art that modifications and variations can be made without departing from the spirit and scope of the invention as defined by the appended claims.

What is claimed is:

1. An electronic component comprising:
   a ceramic main body including two end surfaces in a length direction, two side surfaces in a width direction and top and bottom surfaces in a thickness direction;
   first and second external electrodes disposed on the two end surfaces in the length direction, respectively;
   third and fourth external electrodes disposed on the two side surfaces in the width direction, respectively;

first internal electrodes disposed within the ceramic main body and connected to first and second external electrodes; and
second internal electrodes alternately arranged with the first internal electrodes, while having a ceramic layer interposed therebetween, and connected to the third and fourth external electrodes,
wherein a roughness $R_1$ of the first internal electrode is lower than a roughness $R_2$ of the second internal electrode, and
wherein $0.13 \leq (R_2/t_2) \leq 0.5$ is satisfied, and $t_2$ is the thickness of the second internal electrode.

2. The electronic component of claim 1, wherein:
the electronic component is a three-terminal electronic component, and
a thickness $t_1$ of the first internal electrode is 0.9 μm or less and a thickness $t_2$ of the second internal electrode is 0.9 μm or less.

3. The electronic component of claim 1, wherein the third and fourth external electrodes extend to portions of the top and bottom surfaces of the ceramic main body.

4. The electronic component of claim 1, wherein:
the first and second internal electrodes include a capacitance forming portion and a lead out portion, and
a thickness $t_1$ of the first internal electrode is 0.9 μm or less and a thickness $t_2$ of the second internal electrode is 0.9 μm or less.

5. The electronic component of claim 4, wherein a dimension of the lead out portion of the second internal electrode in the length direction is smaller than that of the capacitance forming portion of the second internal electrode in the length direction.

6. The electronic component of claim 4, wherein a dimension of the lead out portion of the second internal electrode in the length direction is smaller than that of the third and fourth external electrodes in the length direction.

7. An electronic component comprising:
a ceramic main body including two end surfaces in a length direction, two side surfaces in a width direction and top and bottom surfaces in a thickness direction;
first and second external electrodes disposed on the two end surfaces in the length direction, respectively;
third and fourth external electrodes disposed on the two side surfaces in the width direction, respectively;
first internal electrodes disposed within the ceramic main body and connected to first and second external electrodes; and
second internal electrodes alternately arranged with the first internal electrodes, while having a ceramic layer interposed therebetween, and connected to the third and fourth external electrodes, wherein:
a roughness $R_1$ of the first internal electrode is lower than a roughness $R_2$ of the second internal electrode, and
$(R_1/R_2) \leq 0.9$ is satisfied.

8. The electronic component of claim 7, wherein $(R_2/t_2) \leq 0.5$ is satisfied, and $t_2$ is the thickness of the second internal electrode.

9. A multi-terminal electronic component comprising:
first and second external electrodes disposed on two end surfaces of a ceramic main body in a length direction thereof, respectively;
a plurality of third and fourth external electrodes disposed on two side surfaces of the ceramic main body in a width direction thereof, respectively;
a plurality of first internal electrodes laminated within the ceramic main body and connected to the first and second external electrodes; and
a plurality of second internal electrodes alternately arranged with the plurality of first internal electrodes, while having a ceramic layer interposed therebetween, and connected to the plurality of third and fourth external electrodes,
wherein a roughness $R_1$ of the first internal electrode is lower than a roughness $R_2$ of the second internal electrode, and
wherein $0.13 \leq (R_2/t_2) \leq 0.5$ is satisfied, and $t_2$ is the thickness of the second internal electrode.

10. The multi-terminal electronic component of claim 9, wherein a thickness $t_1$ of the first internal electrode is 0.9 μm or less and a thickness $t_2$ of the second internal electrode is 0.9 μm or less.

11. The multi-terminal electronic component of claim 9, wherein the plurality of third and fourth external electrodes extend to portions of the top and bottom surfaces of the ceramic main body.

12. The multi-terminal electronic component of claim 9, wherein:
the first and second internal electrodes include a capacitance forming portion and a lead out portion, and
a thickness $t_1$ of the first internal electrode is 0.9 μm or less and a thickness $t_2$ of the second internal electrode is 0.9 μm or less.

13. The multi-terminal electronic component of claim 12, wherein a dimension of the lead out portion of the second internal electrode in the length direction is smaller than that of the capacitance forming portion of the second internal electrode in the length direction.

14. The multi-terminal electronic component of claim 12, wherein a dimension of the lead out portion of the second internal electrode in the length direction is smaller than that of the third and fourth external electrodes in the length direction.

15. A multi-terminal electronic component comprising:
first and second external electrodes disposed on two end surfaces of a ceramic main body in a length direction thereof, respectively;
a plurality of third and fourth external electrodes disposed on two side surfaces of the ceramic main body in a width direction thereof, respectively;
a plurality of first internal electrodes laminated within the ceramic main body and connected to the first and second external electrodes; and
a plurality of second internal electrodes alternately arranged with the plurality of first internal electrodes, while having a ceramic layer interposed therebetween, and connected to the plurality of third and fourth external electrodes, wherein:
a roughness $R_1$ of the first internal electrode is lower than a roughness $R_2$ of the second internal electrode, and
$(R_1/R_2) \leq 0.9$ is satisfied.

16. The multi-terminal electronic component of claim 15, wherein $(R_2/t_2) \leq 0.5$ is satisfied, and $t_2$ is the thickness of the second internal electrode.

* * * * *